(12) United States Patent
Han et al.

(10) Patent No.: US 11,673,817 B2
(45) Date of Patent: Jun. 13, 2023

(54) CARBON-NANOTUBE/NANO-ADSORPTION-MATERIAL-BASED ELECTRODE AND ELECTROCHEMICAL VALUABLE-METAL RECOVERY DEVICE USING SAME

(71) Applicant: KOREA ADVANCED INSTITUTE OF SCIENCE AND TECHNOLOGY, Daejeon (KR)

(72) Inventors: Jong-In Han, Daejeon (KR); Sumin Yoo, Daejeon (KR); Ga Yeong Kim, Daejeon (KR); Seok Hwan Jeon, Daejeon (KR); Jieun Son, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 50 days.

(21) Appl. No.: 17/528,774

(22) Filed: Nov. 17, 2021

(65) Prior Publication Data
US 2022/0371924 A1 Nov. 24, 2022

(30) Foreign Application Priority Data
May 4, 2021 (KR) .................. 10-2021-0057893

(51) Int. Cl.
| | | |
|---|---|---|
| C25C 1/00 | (2006.01) | |
| C02F 1/461 | (2023.01) | |
| C02F 1/467 | (2023.01) | |
| C25C 1/20 | (2006.01) | |

(Continued)

(52) U.S. Cl.
CPC ........ *C02F 1/46109* (2013.01); *C02F 1/4678* (2013.01); *C25C 1/20* (2013.01);
(Continued)

(58) Field of Classification Search
CPC ............... C02F 1/46109; C02F 1/4678; C02F 2001/46138; C02F 2103/34;
(Continued)

(56) References Cited

FOREIGN PATENT DOCUMENTS

| KR | 102019221 B1 | 9/2019 |
|---|---|---|
| KR | 102193582 B1 | 12/2020 |

OTHER PUBLICATIONS

Bettelheim, A., et al., "Electrochemical Polymerization of Amino-, Pyrrole-, and Hydroxy-Substituted Tetraphenylporphyrins", Inorg. Chem., 1987, pp. 1009-1017, vol. 26, Publisher: American Chemical Society.

(Continued)

*Primary Examiner* — Zulmariam Mendez
(74) *Attorney, Agent, or Firm* — Hultquist, PLLC; Steven J. Hultquist

(57) ABSTRACT

The present invention relates to a carbon-nanotube/nano-adsorption-material-based electrode and an electrochemical valuable-metal recovery device using the same, and more particularly to an environmentally friendly carbon-nanotube/nano-adsorption-material-based electrode and an electrochemical valuable-metal recovery device using the same, in which valuable metals selectively adsorbed from e-waste wastewater are oxidized using, as an anode, an electrode including carbon nanotubes and a nano adsorption material capable of selectively adsorbing valuable metals and are simultaneously reduced at a cathode, thereby separating and recovering valuable metals.

13 Claims, 5 Drawing Sheets

(51) Int. Cl.
*C25C 7/02* (2006.01)
*C02F 103/34* (2006.01)

(52) U.S. Cl.
CPC ...... *C25C 7/02* (2013.01); *C02F 2001/46138* (2013.01); *C02F 2103/34* (2013.01); *C02F 2201/46135* (2013.01); *C02F 2209/02* (2013.01); *C02F 2305/08* (2013.01)

(58) Field of Classification Search
CPC ........ C02F 2201/46135; C02F 2209/02; C02F 2305/08; C25C 1/20; C25C 7/02
See application file for complete search history.

(56) References Cited

OTHER PUBLICATIONS

Dutra, A.J.B., et al., "Copper recovery and cyanide oxidation by electrowinning from a spent copper-cyanide electroplating eletrolyte", Journal of Hazardous Materials, 2008, pp. 648-655, vol. 152, Publisher: Elsevier.

Forti, V., et al., "The Global E-waste Monitor 2020", International Telecommunication Union (ITU) & International Solid Waste Association (ISWA), 2020, Page(s) ISBN Digital: 978-92-808-9114-0, Publisher: United Nations University (UNU), Published in: Bonn, Geneva/Rotterdam.

Juarez, C.M., et al., "Gold Electrowinning From Thiourea Solutions", Minerals Engineering, 2020, pp. 1083-1096, vol. 13, No. 10, Publisher: Pergamon.

Yuasa, M., et al., "Micellar Cobaitporphyrin Nanorods in Alcohols", J. Am. Chem. Soc., 2004, pp. 11128-11129, vol. 126, Publisher: JACS Communications.

Anode (10)　　　　　　　　　　　　Cathode (20)

After adsorption of valuable metal

After application of external voltage

CARBON-NANOTUBE/NANO-ADSORPTION-MATERIAL-BASED ELECTRODE AND ELECTROCHEMICAL VALUABLE-METAL RECOVERY DEVICE USING SAME

CROSS-REFERENCE TO RELATED APPLICATION

The priority under 35 USC § 119 of Korean Patent Application 10-2021-0057893 filed May 4, 2021 is hereby claimed. The disclosure of Korean Patent Application 10-2021-0057893 is hereby incorporated herein by reference, in its entirety, for all purposes.

TECHNICAL FIELD

The present invention relates to a carb on-nanotube/nano-adsorption-material-based electrode and an electrochemical valuable-metal recovery device using the same, and more particularly to an environmentally friendly carbon-nanotube/nano-adsorption-material-based electrode and an electrochemical valuable-metal recovery device using the same, in which valuable metals selectively adsorbed from e-waste wastewater are oxidized using, as an anode, an electrode including carbon nanotubes and a nano adsorption material capable of selectively adsorbing valuable metals and are simultaneously reduced at a cathode, thereby separating and recovering valuable metals.

BACKGROUND ART

Globally, the electrical and electronics industries are growing rapidly with the development of science and technology, and smart electronic products have rapidly spread and become adopted in society. Moreover, it is predicted that more electronic products will be produced in the future based on the spread of artificial intelligence and robot technology.

Meanwhile, the annual increase in the production of electronic products causes a huge amount of e-waste. Accordingly, the importance of recycling e-waste is now known worldwide, but the actual recycling rate is insufficient. Based on data released by the International Telecommunication Union (ITU) in 2020, the amount of e-waste generated worldwide increased by about 9.2 Mt from 2014 to 2020, whereas the amount of recycled e-waste increased by only 1.8 Mt (Forti et al., United Nations University (UNU), International Telecommunication Union (ITU) & International Solid Waste Association (ISWA), Bonn/Geneva/Rotterdam 2020). In addition, since e-waste contains various valuable metals such as gold (Au), silver (Ag), platinum (Pt) group metals, and the like, technology for recovering valuable metals therefrom has high economic and environmental value. Currently, representative technology for recovering valuable metals from e-waste includes dry smelting, which recovers valuable metals by melting electronic products at high temperatures, and wet smelting, which recovers valuable metals using chemicals. However, this valuable-metal recovery technology requires several steps to recover small amounts of valuable metals from a solution in which various metals are mixed, so the loss of valuable metals is large, and secondary environmental problems occur related to high energy consumption and the use of highly toxic chemicals. Therefore, it is necessary to develop technology capable of safely processing an increased number of electronic products within legal regulations.

Recently, various attempts have been made to recover valuable metals using an electrochemical process in an environmentally friendly manner. A representative example thereof is an electrodialysis process that separates specific ions from wastewater. As such, the development of technology based on ion exchange membranes is the key to increasing selectivity for valuable metals, but the current technology requires high external voltage, and it is difficult to reuse the ion exchange membrane due to the formation of deposits thereon.

Among methods capable of separating and recovering various types of valuable metals, thorough research is currently ongoing into selectively recovering valuable metals using adsorbents such as silica, polymers, activated carbon, chitosan, and the like. However, in order to use such an adsorbent in the valuable-metal recovery industry, the development of subsequent adsorbent processing is essentially required. In particular, in order to use the adsorbent in a valuable-metal recovery process, it is necessary to apply energy within a range that prevents damage to valuable metals strongly attached to the adsorbent so as to enable the reuse of the adsorbent, or to use a chemical additive that helps desorption of metal that is strongly attached to the adsorbent.

For example, Korean Patent No. 10-2019221 discloses that valuable metals attached to an adsorbent are added to a desorption solution containing thiourea, sulfite, thiosulfate, or a mixture thereof, and then electricity is applied to the desorption solution to thus reduce and recover the valuable metals. In this patent, in order to desorb valuable metals attached to the adsorbent, typical wet smelting using a desorption solution containing thiourea, sulfite, thiosulfate, or the like is performed, after which an electrical reduction recovery process is performed on the desorption solution in which valuable metals are dissolved. In the typical wet smelting process, large amounts of gases and wastewater, which cause environmental pollution, are generated in the metal leaching step, and problems related to byproducts and corrosion in the reactor occur. Furthermore, in order to reuse the adsorbent, it is necessary to separate and regenerate the adsorbent in the desorption solution.

C. M. Juarez et al. proposed a process for recovering gold dissolved in thiourea leachate using electroreduction. Thiourea has advantages of high metal desorption efficiency and low toxicity. However, in the leaching process, two thiourea components react, thereby irreversibly forming formamidine disulfide (FDS), so there is a problem in that the consumption of thiourea is high. Moreover, thiourea is more expensive than leachates generally used in wet smelting, so an additional leachate regeneration process is required.

A. J. B. Dutra et al. discloses that copper in wastewater is recovered using cyanide and the cyanide is reduced and regenerated. Here, cyanide is a material having strong toxicity causing a decline in function of the respiratory system and cardiovascular system, and recently, the use of compounds in place of cyanide and environmentally friendly recovery methods therefor have been reported.

Accordingly, the present inventors have made great efforts to solve the above problems, and thus ascertained that, when using an electrochemical valuable-metal recovery device including an anode made of carbon nanotubes and a nano adsorption material including a porous porphyrin polymer of Chemical Formula 1 capable of selectively adsorbing elemental precious metals, precious metals adsorbed to the polymer may be recovered with high efficiency even at a low external voltage, and moreover, the polymer may be reused after desorption of the precious metals therefrom, thus enabling efficient reuse of the porous porphyrin polymer capable of selectively adsorbing precious metals and high usability of selectively separated precious metals, thereby culminating in the present invention.

PRIOR ART DOCUMENTS

Patent Documents

Korean Patent No. 10-2193582
Korean Patent No. 10-2019221

Non-Patent Documents

V. Forti, C. Baldé, R. Kuehr and G. Bel, United Nations University (UNU), International Telecommunication Union (ITU) & International Solid Waste Association (ISWA), Bonn/Geneva/Rotterdam 2020
C. M. Juarez et al., Gold electrowinning from thiourea solutions, Minerals Engineering, Volume 13, Issues 10-11, September 2000, Pages 1083-1096
A. J. B. Dutra et al., Copper recovery and cyanide oxidation by electrowinning from a spent copper-cyanide electroplating electrolyte, Journal of Hazardous Materials, Volume 152, Issue 2, 1 Apr. 2008, Pages 648-655

SUMMARY OF THE INVENTION

It is an object of the present invention to provide an electrode, which uses carbon nanotubes and a nano adsorption material having selectivity for valuable metals, and an electrochemical single-chamber valuable-metal recovery device, which includes the same and is thus capable of improving the efficiency of oxidation and reduction reactions and quickly recovering valuable metals even at a low external voltage in an environmentally friendly manner without using highly toxic chemicals.

In order to accomplish the above object, the present invention provides an electrochemical valuable-metal recovery device 100 including an anode 10 to which a valuable metal is adsorbed and oxidized, a cathode 20 to which the valuable metal oxidized at the anode is adsorbed and reduced, and a reactor 30 into which e-waste wastewater containing the valuable metal and an electrolyte are supplied, in which the anode 10 is a carbon-nanotube/nano-adsorption-material-based electrode made of carbon nanotubes and a nano adsorption material including a porphyrin polymer represented by Chemical Formula 1 below.

[Chemical Formula 1]

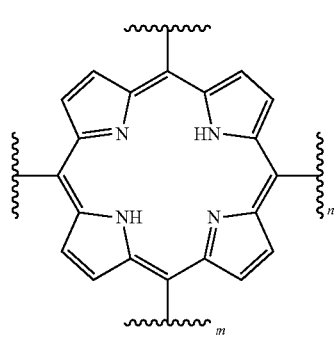

In Chemical Formula 1, n is an integer of 5,000 to 50,000, and m is an integer of 5,000 to 50,000.

In addition, the present invention provides an electrochemical valuable-metal recovery method including (a) supplying e-waste wastewater and an electrolyte to the reactor 30 of the electrochemical valuable-metal recovery device 100 to thus adsorb a valuable metal to the anode 10 of the electrochemical valuable-metal recovery device 100 and (b) applying a voltage across the anode 10 and the cathode 20 such that the valuable metal adsorbed to the anode 10 is oxidized and coupled with a ligand present in the electrolyte to form a metal-ligand complex and the metal-ligand complex is adsorbed to the cathode 20 and reduced on the surface of the cathode 20, thereby recovering the valuable metal.

BRIEF DESCRIPTION OF REFERENCE NUMERALS

Figure 1:
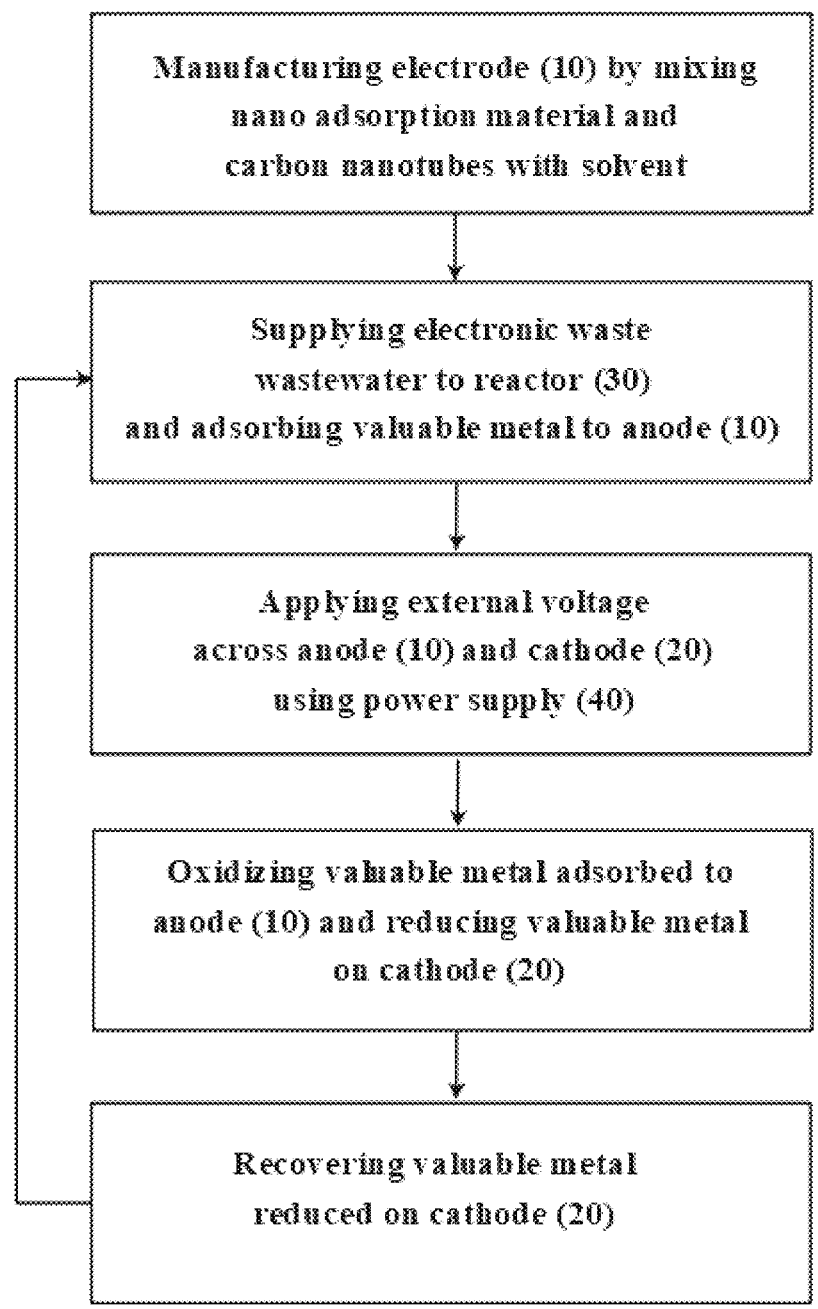
FIG. 1 is a flowchart showing a process of manufacturing a carbon-nanotube/nano-adsorption-material-based electrode according to an embodiment and an electrochemical valuable-metal recovery process using the same.

10: anode
20: cathode
30: reactor
40: power supply and voltage regulator
100: valuable-metal recovery device

BEST MODE FOR CARRYING OUT THE INVENTION

Unless otherwise defined, all technical and scientific terms used in the present specification have the same meanings as commonly understood by those skilled in the art to which the present disclosure pertains. In general, the nomenclature used in the present specification is well known and commonly used in the art.

The present invention is intended to provide an electrode manufactured by mixing carbon nanotubes with a nano adsorption material having high ability to recover valuable metals, and an electrochemical single-chamber valuable-metal recovery device having no ion exchange membrane using the same, thus recovering precious metals adsorbed to the polymer with high efficiency even at a low external voltage and enabling reuse of the polymer even after desorption of precious metals.

Therefore, an aspect of the present invention pertains to an electrochemical valuable-metal recovery device 100 including an anode 10 to which valuable metals are adsorbed and oxidized, a cathode 20 to which the valuable metals oxidized at the anode are adsorbed and reduced, and a reactor 30 into which e-waste wastewater containing the valuable metals and an electrolyte are supplied, in which the anode 10 is a carbon-nanotube/nano-adsorption-material-based electrode made of carbon nanotubes and a nano adsorption material including a porphyrin polymer represented by Chemical Formula 1 below.

[Chemical Formula 1]

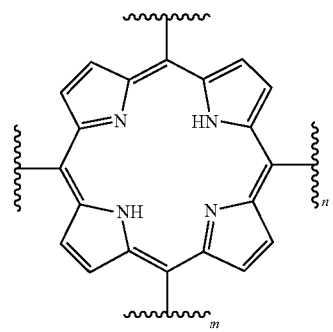

In Chemical Formula 1, n is an integer of 5,000 to 50,000, and m is an integer of 5,000 to 50,000.

Another aspect of the present invention pertains to an electrochemical valuable-metal recovery method including (a) supplying e-waste wastewater and an electrolyte to the reactor 30 of the electrochemical valuable-metal recovery device 100 to thus adsorb valuable metals to the anode 10 of the electrochemical valuable-metal recovery device 100 and (b) applying a voltage across the anode 10 and the cathode 20 such that the valuable metals adsorbed to the anode 10 are oxidized and coupled with a ligand present in the electrolyte to form a metal-ligand complex and the metal-ligand complex is adsorbed to the cathode 20 and reduced on the surface of the cathode 20, thereby recovering the valuable metals.

Hereinafter, the present invention will be described in detail.

In the present invention, the anode 10 may be manufactured by dispersing the nano adsorption material and carbon nanotubes in a solvent, volatilizing the solvent, applying the result of volatilization on a substrate, and performing drying.

In the present invention, the nano adsorption material may be a material based on a chelate functional structure, such as porphyrin, phthalocyanine, salen, salophen, amidoxime, catechol, etc., which have excellent adsorption ability to gold (Au), silver (Ag), and platinum (Pt) groups. The nano adsorption material is preferably exemplified by a porphyrin polymer, particularly a porphyrin polymer represented by Chemical Formula 1-1 below.

[Chemical Formula 1-1]

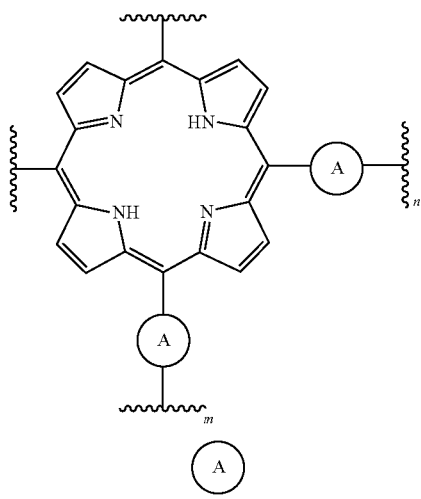

In the present invention, more preferably, the porphyrin polymer is represented by Chemical Formula 2 below.

[Chemical Formula 2]

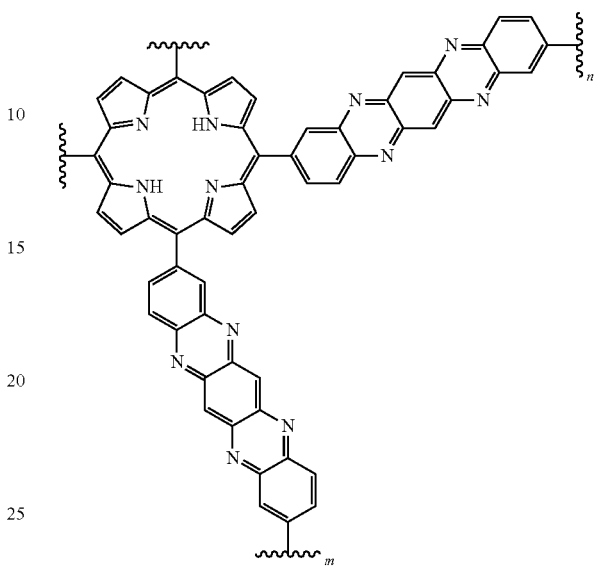

In Chemical Formula 2, n is an integer of 5,000 to 50,000, and m is an integer of 5,000 to 50,000.

The electrochemical valuable-metal recovery device of the present invention may further include a power supply and voltage regulator 40 configured to supply electrical energy to the anode 10 and the cathode 20, a pump (not shown) configured to continuously supply wastewater and an electrolyte to the reactor, and a temperature controller (not shown).

In the present invention, the electrolyte solution may be a solution including at least one ion selected from the group consisting of a chloride ion ($Cl^-$), a bromide ion ($Br^-$), an iodide ion ($I^-$), and a sulfate ion ($SO_4^{2-}$).

In the present invention, the electrolyte solution may further include a buffer including potassium phosphate ($K_2HPO_4$) or sodium phosphate ($Na_2HPO_4$).

In the present invention, the cathode may include at least one material selected from the group consisting of graphite, platinum (Pt), gold (Au), nickel (Ni), iron (Fe), copper (Cu), titanium (Ti), ruthenium (Ru), osmium (Os), palladium (Pd), and iridium (Ir).

In the present invention, the valuable metal may be selected from the group consisting of gold (Au), platinum (Pt), and silver (Ag).

In the present invention, an ion exchange membrane is not provided.

Figure 2:
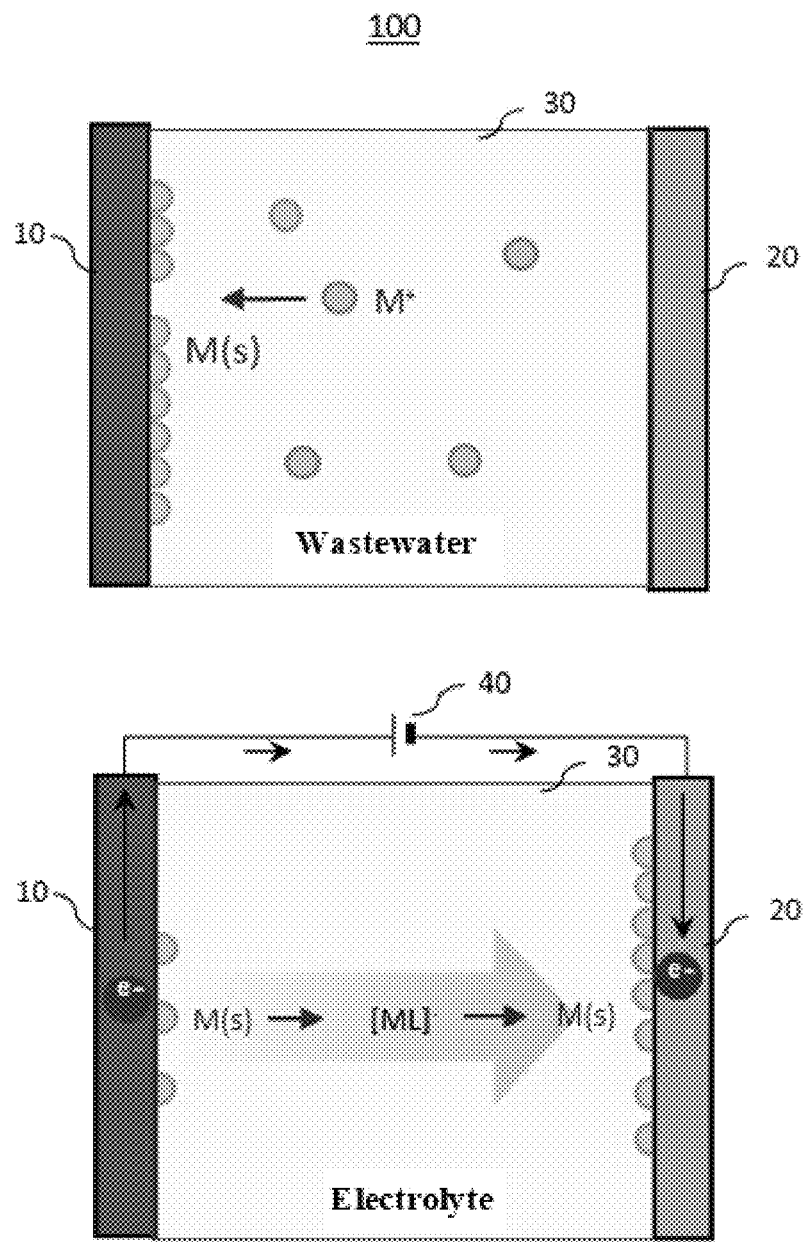
FIG. 2 is views showing an electrochemical valuable-metal recovery device 100 using the carbon-nanotube/nano-adsorption-material-based electrode.

With reference to FIGS. 1 and 2, the process of manufacturing a carbon-nanotube/nano-adsorption-material-based electrode and the electrochemical valuable-metal recovery process using the same will be described in more detail.

As shown in FIG. 1, a detailed description of the manufacture of an electrode for electrolysis is as follows. The nano adsorption material and carbon nanotubes are mixed at a predetermined ratio with an organic solvent and dispersed for a predetermined time using an ultrasonic disperser, after which the organic solvent is removed from the dispersed solution for a predetermined time in a predetermined atmosphere to obtain a uniform and rigid electrode.

The electrochemical valuable-metal recovery device 100 of FIG. 2 is made of a material capable of preventing corrosion of the reactor in consideration of the need to handle very strongly acidic e-waste wastewater, and may be used in connection with a power supply and voltage regulator 40 configured to supply electrical energy to a pair of electrodes 10, 20, a pump configured to supply wastewater and an electrolyte to the reactor 30 for a continuous reaction, a temperature controller, and the like.

In the valuable-metal adsorption step of FIG. 1, e-waste wastewater is supplied to thus selectively adsorb valuable metals to the carbon-nanotube/nano-adsorption-material-based electrode. For example, e-waste contains valuable metals such as gold (Au), silver (Ag), platinum (Pt) group metals, and the like. Here, the carbon-nanotube/nano-adsorption-material-based electrode to which the valuable metals are adsorbed is used as the anode 10. The anode 10 is able to provide electrons when a voltage is applied thereto. Accordingly, the valuable metals adsorbed to the anode are oxidized and coupled with a ligand present in the electrolyte to form a metal-ligand complex. The cathode, which is a substrate on which valuable metals are reduced, is made of at least one material selected from among a metal material, such as platinum (Pt), gold (Au), nickel (Ni), iron (Fe), copper (Cu), titanium (Ti), ruthenium (Ru), osmium (Os), palladium (Pd), and iridium (Ir), and a carbon-based material such as graphite. Any material may be used for the cathode without particular limitation, so long as it is conductive.

The cathode 20 receives electrons when a voltage is applied thereto. Accordingly, the metal-ligand complex present in the electrolyte is reduced on the cathode surface.

The electrolyte that is used is a solution including at least one selected from among a chloride ion ($Cl^-$), a bromide ion ($Br^-$), an iodide ion ($I^-$), and a sulfate ion ($SO_4^{2-}$), which are ligands having high binding affinity to valuable metals.

In the electrochemical valuable-metal recovery device 100 shown in FIG. 2, both a two-electrode cell and a three-electrode cell may be used, and an ion exchange membrane may be provided, as necessary.

The external voltage may vary depending on the type of the metal-ligand complex and the type of cathode. As such, the rate of recovery of valuable metals and the ratio of oxygen and hydrogen gas as additional products may vary.

The carbon-nanotube/nano-adsorption-material-based electrode according to the present invention may be reused by oxidizing and separating the valuable metals adsorbed on the surface thereof during use as an anode, thus exhibiting superior usability and generating economic benefits.

When an external voltage is applied to the electrochemical valuable-metal recovery device using, as an anode, the carbon-nanotube/nano-adsorption-material-based electrode capable of selectively adsorbing valuable metals, the valuable metals may be reduced and recovered at the counter electrode, and the carbon-nanotube/nano-adsorption-material-based electrode may be reused. Hence, energy consumption may be minimized, and valuable metals may be recovered quickly in an environmentally friendly manner by decreasing the use of chemicals.

Moreover, in the present invention, valuable metals may be selectively and sequentially recovered using variables including voltage in the electrochemical system. For example, it is possible to separate and recover gold, silver, and platinum having different reduction potentials. Specifically, when an external voltage is applied from a low level to a high level, a valuable metal having a low standard reduction potential and a valuable metal having a high standard reduction potential may be sequentially recovered.

The representative valuable metals that may be recovered from e-waste and the standard reduction potentials thereof are silver (0.8 V vs. SHE), palladium (0.95 V vs. SHE), platinum (1.18 V vs. SHE), and gold (1.5 V vs. SHE). Since a metal is reduced only when a voltage higher than the standard reduction potential thereof is applied thereto, silver, palladium, platinum, and gold may be sequentially recovered while raising the external voltage from a low level to a high level during the electrochemical desorption process.

Therefore, in the present invention, when a voltage is applied across the anode 10 and the cathode 20 in step (b), an external voltage is applied in the sequence of 0.8 V to less than 0.95 V, 0.95 V to less than 1.18 V, 1.18 V to less than 1.5 V, and 1.5V or more, thereby sequentially recovering silver, palladium, platinum, and gold.

Hereinafter, preferred examples will be presented to aid in understanding the present invention, but it will be apparent to those skilled in the art that the following examples are merely illustrative of the present invention, and various variations and modifications are possible without departing from the scope and spirit of the present invention. It should be understood that such variations and modifications fall within the scope of the appended claims.

EXAMPLES

Preparation Example 1: Synthesis of Porous Porphyrin Polymer

A porous porphyrin polymer was prepared through a two-step reaction including (a) preparation of 5,10,15,20-tetrakis(4-nitrophenyl)-21H,23H-porphyrin as a monomer of the polymer and (b) synthesis of a porous polymer from 5,10,15,20-tetrakis(4-nitrophenyl)-21H,23H-porphyrin.

Preparation of 5,10,15,20-tetrakis(4-nitrophenyl)-21H,23H-porphyrin thereinafter referred to as TNPPH2)

The monomer TNPPH2 was prepared by slightly changing the synthesis method reported in the literature (Bettelheim, A. et al., *Inorganic Chemistry* 26.7 (1987): 1009-1017; Yuasa, Makoto et al., *Journal of the American Chemical Society* 126.36 (2004): 11128-11129).

11.0 g of 4-nitrobenzaldehyde was dissolved in 300 mL of propionic acid, and the resulting solution was introduced with 12.0 mL of acetic anhydride. After raising the temperature to the point at which the solution was refluxed, 5.0 mL of pyrrole was slowly introduced into the solution. The resulting mixture was further reacted at a reflux temperature for 30 minutes and then given time to cool to room temperature. The solid product was separated by filtration from the solution, dried at room temperature, and then dried in a vacuum oven at 120° C. The dried solid product was added to 120 mL of a pyridine solution, and the resulting mixture was boiled at a reflux temperature with stirring. The mixture was cooled to room temperature for 1 hour, and the precipitate was filtered and washed with acetone until the solution did not appear dark. The purple product thus obtained was dried at room temperature and then dried in a vacuum oven at 100° C.

Preparation of Porous Porphyrin Polymer 1 g of TNPPH2, 275 mg of p-phenylenediamine, and 710 mg of potassium hydroxide were added to 200 mL of dehydrated N,N-dimethylformamide. The mixed solution was stirred for 1 hour in a nitrogen atmosphere. The temperature of the mixed solution was raised to 150° C. and the reaction was allowed to proceed for 24 hours in a nitrogen atmosphere. After the reaction, when the temperature of the mixture reached room temperature, 1 L of water was added thereto. The mixture was stirred for 1 hour, and the precipitate was then filtered and dried. The resulting black precipitate was purified using Soxhlet extraction for 1 day with each of N,N-dimethylformamide and water. The final product was dried in a vacuum oven at 150° C. A product in a black powder form was obtained at a yield of about 75.85%.

Example 1: Manufacture of Carbon-Nanotube/Nano-Adsorption-Material-Based Electrode and Device Using the Same 1 g of each of a nano adsorption material and carbon nanotubes at the same weight ratio was mixed with an organic solvent and dispersed for 1 hour using an ultrasonic disperser, and the organic solvent was volatilized.

Here, the porous porphyrin polymer prepared as described above was used as the nano adsorption material. When the above solution took the form of viscous conductive ink, it was applied in a predetermined amount on glass and then dried to obtain a uniform and rigid carbon-nanotube/nano-adsorption-material-based electrode.

The system device 100 was composed of a single chamber having an anode and a cathode, the area of the electrode was 2 cm², an electrolyte inlet was provided at each of the bottom and top of the anode PEEK cell, and an Ag/AgCl reference electrode (electrode pore: 2 mm) insertion port was provided at the side thereof. In the step of adsorbing the valuable metal to the anode 10, 200 ml of a 100 ppm gold synthesis solution was brought into contact with the electrode at a rate of 50 ml/min for 24 hours using a pump.

Figure 3:
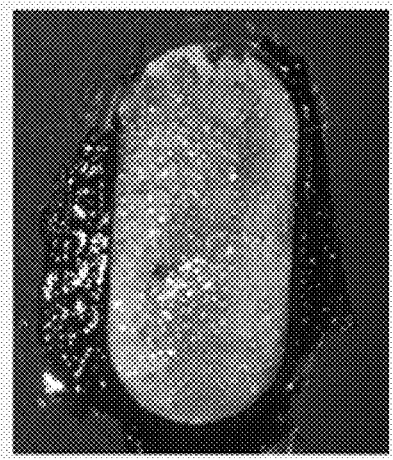
FIG. 3 is photographs showing the valuable metal recovered at the anode 10 and the cathode 20 according to the embodiment of FIG. 1.
Figure 3:
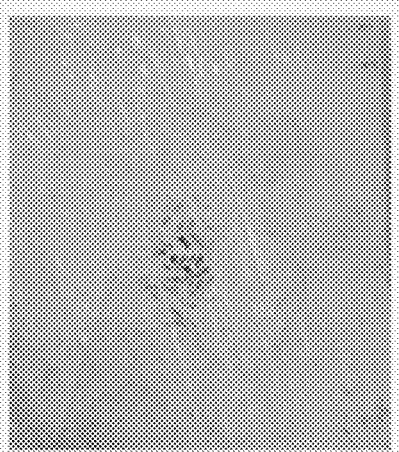
Figure 3:
Figure 3:
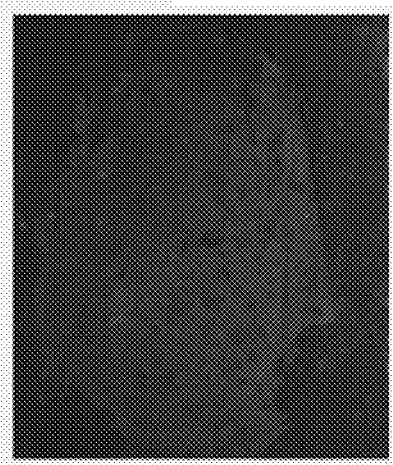
Figure 3:
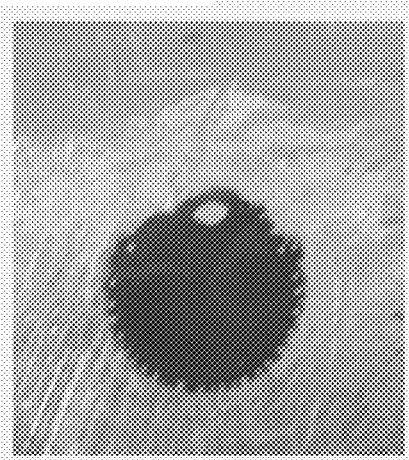

Thereafter, as a result of applying an external voltage to 1.2 V (Ag/AgCl reference electrode) for 3 hours for oxidation and reduction of the valuable metal, as shown in FIG. 3, the valuable metal could be separated and recovered on the substrate of the cathode 20. As the electrolyte for electrolysis, 0.1 M HCl was used. In order to calculate the current density and valuable-metal recovery efficiency, the electrolyte was sampled and inductively coupled plasma spectroscopy was performed.

Figure 4:
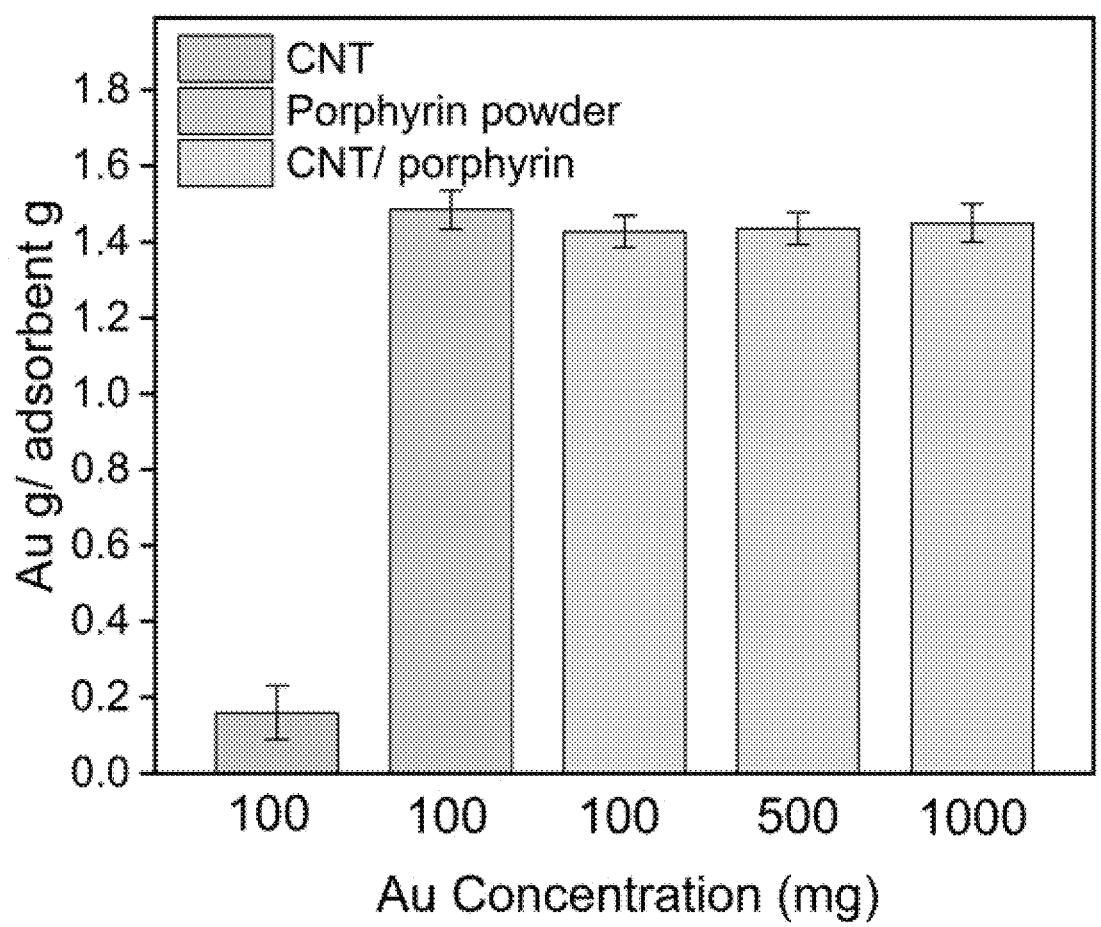
FIG. 4 is a graph showing the adsorption performance of the carbon-nanotube/nano-adsorption-material-based electrode according to an embodiment of the present invention.

Example 2: Measurement of Adsorption Performance of Carbon-Nanotube/Nano-Adsorption-Material-Based Electrode The adsorption performance of the carbon-nanotube/nano-adsorption-material-based electrode was measured, and the results thereof are shown in FIG. 4. For adsorption performance, the solution before and after adsorption was sampled, the concentration thereof was measured using ICP-OES (ICP-OES 5110; Agilent, USA), and then the adsorption amount was calculated. Based on the experimental results shown in FIG. 4, the adsorption performance of the carbon-nanotube/nano-adsorption-material-based electrode (CNT/COP electrode) was induced by the nano adsorption material, and the adsorption amount was determined to be 1.4 g Au or more per g of adsorbent at all of the initial gold concentrations of 100, 500, and 1000 ppm. In addition, the carbon-nanotube/nano-adsorption-material-based electrode developed in the present invention significantly maintained the adsorption performance of the nano adsorption material (COP-180 powder).

Figure 5:
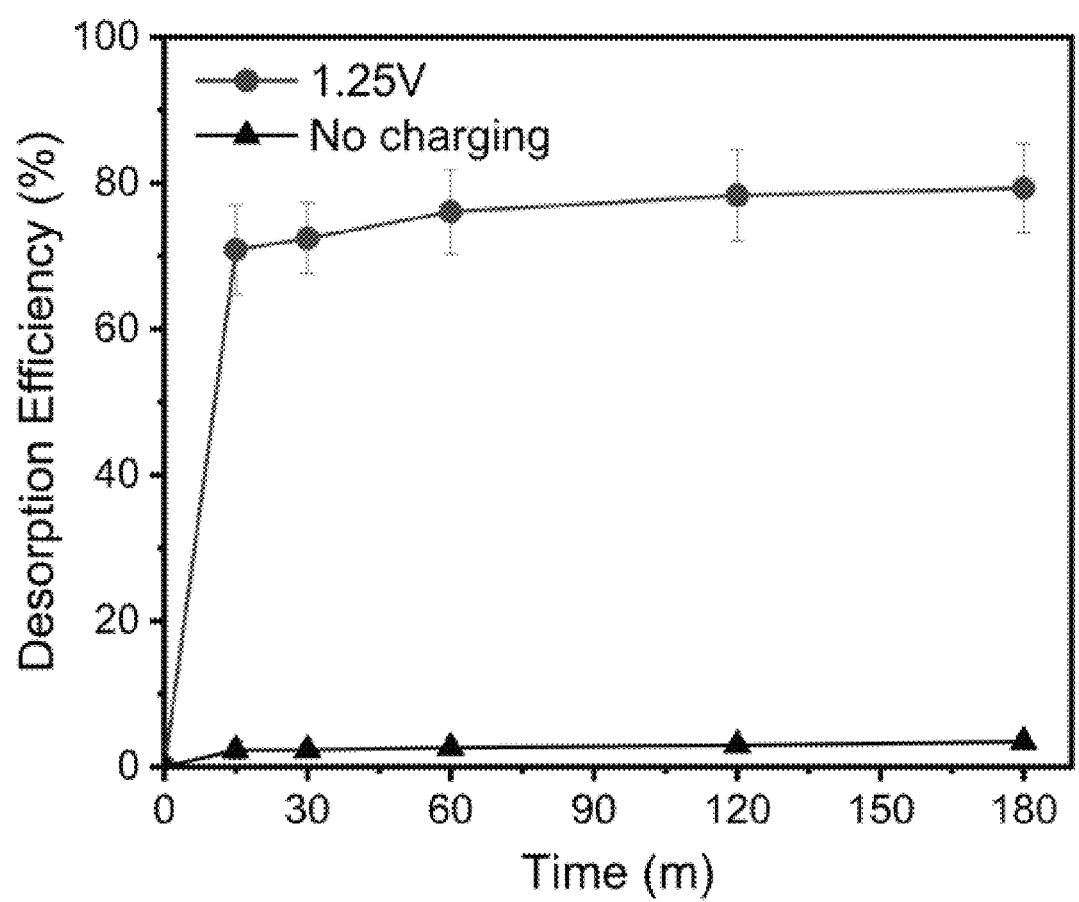
FIG. 5 is a graph showing the rate of desorption of gold adsorbed to the carbon-nanotube/nano-adsorption-material-based electrode of the present invention.

Example 3: Measurement of Rate of Desorption of Gold Adsorbed to Carbon-Nanotube/Nano-Adsorption-Material-Based Electrode The rate of desorption of gold adsorbed to the carbon-nanotube/nano-adsorption-material-based electrode was measured, and the results thereof are shown in FIG. 5. Desorption performance was calculated by sampling the solution after desorption and then measuring the concentration thereof using ICP-OES (ICP-OES 5110; Agilent, USA). The carbon-nanotube/nano-adsorption-material-based electrode to which gold was adsorbed was oxidized using 0.1 M HCl as an electrolyte at 1.25 V (vs. Ag/AgCl), and the desorption performance was determined to be about 75% for 15 minutes and about 79% for 3 hours. In addition, in a comparative experiment, when the electrode was immersed in 0.1 M HCl without applying an external voltage, desorption performance of about 3.4% for 3 hours was exhibited.

Although specific embodiments of the present invention have been disclosed in detail as described above, it will be obvious to those of ordinary skill in the art that the description is merely of preferable exemplary embodiments and is not to be construed as limiting the scope of the present invention. Therefore, the substantial scope of the present invention will be defined by the appended claims and equivalents thereof.

INDUSTRIAL APPLICABILITY

In a carbon-nanotube/nano-adsorption-material-based electrode and an electrochemical valuable-metal recovery device using the same according to the present invention, a filtering process of separating an adsorbent is obviated because the adsorption material is used for an electrode, and a low external voltage is applied to a predetermined cell, so valuable metals attached to the adsorbent are desorbed and recovered, thereby minimizing the use of chemical additives conventionally essential for recovery of valuable metals and thus preventing secondary environmental problems.

In addition, the present invention is a device capable of recovering valuable metals even at a low external voltage without using highly toxic chemicals, and is an environmentally friendly electrochemical device that can quickly separate and recover large amounts of valuable metals and can be reused because there is no structural change due to the use of the electrolyte and the application of voltage.

Although the present invention has been described in detail with reference to specific features, it will be apparent to those skilled in the art that this description is only of a preferred embodiment thereof, and does not limit the scope of the present invention. Thus, the substantial scope of the present invention will be defined by the appended claims and equivalents thereto.

What is claimed is:

1. An electrochemical valuable-metal recovery device, comprising:
    an anode on which a valuable metal is adsorbed and oxidized;
    a cathode on which the valuable metal oxidized on the anode is adsorbed and reduced; and
    a reactor to which electronic waste wastewater containing the valuable metal and an electrolyte are supplied,
    wherein the anode is a carbon nanotube/nano adsorption material-based electrode made of carbon nanotubes and a nano adsorption material comprising a porphyrin polymer represented by Chemical Formula 1:

[Chemical Formula 1]

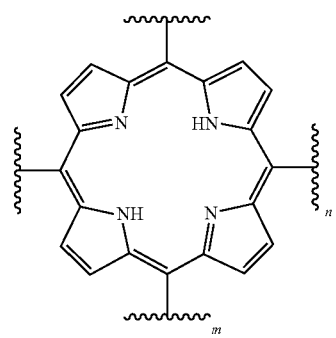

wherein n is an integer of 5,000 to 50,000, and m is an integer of 5,000 to 50,000.

2. The electrochemical valuable-metal recovery device of claim 1, wherein the anode is prepared by dispersing the nano adsorption material and the carbon nanotubes in a solvent, volatilizing the solvent, applying on a substrate, and drying.

3. The electrochemical valuable-metal recovery device of claim 1, wherein the porphyrin polymer is represented by Chemical Formula 1-1:

[Chemical Formula 1-1]

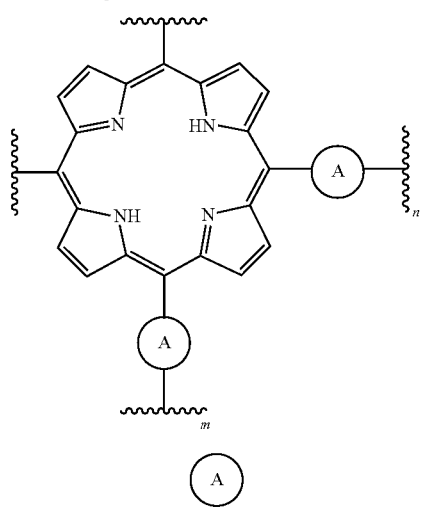

4. The electrochemical valuable-metal recovery device of claim 1, wherein the porphyrin polymer is represented by Chemical Formula 2:

[Chemical Formula 2]

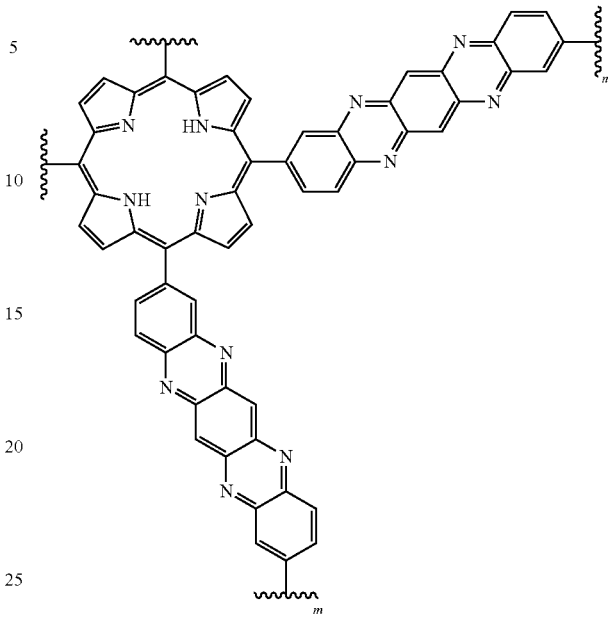

wherein n is an integer of 5,000 to 50,000, and m is an integer of 5,000 to 50,000.

5. The electrochemical valuable-metal recovery device of claim 1, further comprising a power supply and voltage regulator configured to supply electrical energy to the anode and the cathode, a pump configured to continuously supply wastewater and an electrolyte to the reactor, and a temperature controller.

6. The electrochemical valuable-metal recovery device of claim 1, wherein a solution of the electrolyte is a solution comprising at least one ion selected from the group consisting of a chloride ion ($Cl^-$), a bromide ion ($Br^-$), an iodide ion ($I^-$), and a sulfate ion ($SO_4^{2-}$).

7. The electrochemical valuable-metal recovery device of claim 1, wherein a solution of the electrolyte further comprises a buffer comprising potassium phosphate ($K_2HPO_4$) or sodium phosphate ($Na_2HPO_4$).

8. The electrochemical valuable-metal recovery device of claim 1, wherein the cathode comprises at least one material selected from the group consisting of graphite, platinum (Pt), gold (Au), nickel (Ni), iron (Fe), copper (Cu), titanium (Ti), ruthenium (Ru), osmium (Os), palladium (Pd), and iridium (Ir).

9. The electrochemical valuable-metal recovery device of claim 1, wherein the valuable metal is selected from the group consisting of gold (Au), platinum (Pt), and silver (Ag).

10. The electrochemical valuable-metal recovery device of claim 1, wherein an ion exchange membrane is not provided.

11. An electrochemical valuable-metal recovery method, comprising:
    (a) supplying electronic waste wastewater and an electrolyte to a reactor of the electrochemical valuable-metal recovery device of claim 1 to adsorb a valuable metal to an anode of the electrochemical valuable-metal recovery device; and
    (b) applying a voltage across the anode and a cathode such that the valuable metal adsorbed to the anode is oxidized and coupled with a ligand in the electrolyte to form a metal-ligand complex and the metal-ligand complex is adsorbed to the cathode and reduced on a surface of the cathode (20), thereby recovering the valuable metal.

12. The electrochemical valuable-metal recovery method of claim 11, wherein the anode is reused after the valuable metal is recovered.

13. The electrochemical valuable-metal recovery method of claim 11, wherein, when the voltage is applied across the anode and the cathode in step (b), an external voltage is applied in a sequence of 0.8 V to less than 0.95 V, 0.95 V to less than 1.18 V, 1.18 V to less than 1.5 V, and 1.5 V or more, so that silver, palladium, platinum, and gold are sequentially recovered.

* * * * *

UNITED STATES PATENT AND TRADEMARK OFFICE
CERTIFICATE OF CORRECTION

| | | |
|---|---|---|
| PATENT NO. | : 11,673,817 B2 | Page 1 of 1 |
| APPLICATION NO. | : 17/528774 | |
| DATED | : June 13, 2023 | |
| INVENTOR(S) | : Jong-In Han et al. | |

It is certified that error appears in the above-identified patent and that said Letters Patent is hereby corrected as shown below:

In the Specification

Column 1, Lines 17-18, "carb on-nanotube/nano-adsorption-material-based electrode" should be
-- carbon-nanotube/nano-adsorption-material-based electrode --.

Signed and Sealed this
Twenty-ninth Day of August, 2023

Katherine Kelly Vidal
Director of the United States Patent and Trademark Office